United States Patent
Goodwin et al.

(10) Patent No.: US 11,619,356 B2
(45) Date of Patent: Apr. 4, 2023

(54) HOT TAP SYSTEM AND METHOD FOR COATED DUCTWORK

(71) Applicant: Fab-Tech, Inc., Colchester, VT (US)

(72) Inventors: Jeffrey A. Goodwin, Jericho, VT (US); Michael J. Ambrisco, Fletcher, VT (US)

(73) Assignee: Fab-Tech, Inc., Colchester, VT (US)

( * ) Notice: Subject to any disclaimer, the term of this patent is extended or adjusted under 35 U.S.C. 154(b) by 786 days.

(21) Appl. No.: 16/544,165

(22) Filed: Aug. 19, 2019

(65) Prior Publication Data

US 2019/0368662 A1 Dec. 5, 2019

Related U.S. Application Data

(62) Division of application No. 15/221,157, filed on Jul. 27, 2016, now Pat. No. 10,408,386.

(60) Provisional application No. 62/208,125, filed on Aug. 21, 2015.

(51) Int. Cl.
| | |
|---|---|
| *F17D 1/00* | (2006.01) |
| *F16L 41/00* | (2006.01) |
| *F16L 23/00* | (2006.01) |
| *F16L 41/06* | (2006.01) |
| *F16L 23/02* | (2006.01) |

(52) U.S. Cl.
CPC .............. *F17D 1/00* (2013.01); *F16L 23/02* (2013.01); *F16L 41/06* (2013.01)

(58) Field of Classification Search
CPC ... F17D 1/00; F16L 23/02; F16L 41/06; F24F 13/02
See application file for complete search history.

(56) References Cited

U.S. PATENT DOCUMENTS

| | | | |
|---|---|---|---|
| 2,100,884 A | 11/1937 | Trickey | |
| 2,239,509 A | 4/1941 | Uecker | |
| 2,441,009 A | 5/1948 | Cunningham | |
| 3,811,714 A * | 5/1974 | Pintard | F16L 51/021 285/236 |
| 4,573,628 A | 3/1986 | Dohlen et al. | |
| 4,964,470 A | 10/1990 | Gaulin | |
| 5,080,403 A | 1/1992 | Paoluccio | |
| 5,090,871 A * | 2/1992 | Story | F16L 23/167 417/63 |
| 5,197,766 A * | 3/1993 | Glover | F16L 23/167 285/368 |
| 5,534,337 A * | 7/1996 | Bailey, Jr. | B32B 5/024 428/421 |

(Continued)

FOREIGN PATENT DOCUMENTS

WO  2013137713 A1  9/2013

*Primary Examiner* — Kevin R Barss
(74) *Attorney, Agent, or Firm* — Downs Rachlin Martin PLLC (57) ABSTRACT

Systems, apparatus and methods for hot tapping into pressurized, coated duct systems for transporting corrosive substances are disclosed. A branch line may be installed in such systems without shutting down or depressurizing the system using the disclosed systems, apparatus and methods without compromising the system coating or resistance to corrosion from the transported substances. Cut edges created when ductwork is cut to install a branch line are captured and sealed between two gaskets, avoiding the need for recoating with difficult to apply corrosive protection materials such as fluoropolymer coatings.

19 Claims, 10 Drawing Sheets

(56) References Cited

U.S. PATENT DOCUMENTS

| | | | | |
|---|---|---|---|---|
| 5,549,949 | A | 8/1996 | Williams | |
| 6,508,490 | B1 | 1/2003 | Hoffman | |
| 6,729,657 | B2 | 5/2004 | Haymon | |
| 8,333,211 | B2 | 12/2012 | McGraw | |
| 8,393,649 | B2 * | 3/2013 | Kitaguchi | F16L 23/167 |
| | | | | 285/368 |
| 8,540,287 | B2 | 9/2013 | Williams | |
| 8,936,280 | B2 | 1/2015 | Williams | |
| 10,408,386 | B2 * | 9/2019 | Goodwin | F16L 41/06 |
| 10,966,347 | B2 * | 3/2021 | Wei | H05K 7/20272 |
| 2003/0127853 | A1 | 7/2003 | Haymon | |
| 2005/0150550 | A1 | 7/2005 | Maichel | |
| 2008/0314774 | A1 * | 12/2008 | Granadino | G01M 3/226 |
| | | | | 73/40 |
| 2009/0065069 | A1 | 3/2009 | Pretorius | |
| 2010/0187813 | A1 | 7/2010 | Anders | |
| 2011/0185793 | A1 * | 8/2011 | Harrison | G01M 3/28 |
| | | | | 277/320 |
| 2011/0186305 | A1 * | 8/2011 | Wilde | E21B 33/02 |
| | | | | 166/380 |
| 2013/0187376 | A1 | 7/2013 | Williams | |
| 2014/0202577 | A1 * | 7/2014 | Webster, III | F16L 41/023 |
| | | | | 138/177 |
| 2017/0051862 | A1 * | 2/2017 | Goodwin | F16L 23/02 |
| 2022/0154968 | A1 * | 5/2022 | Sinur | F24F 13/14 |

* cited by examiner

HOT TAP SYSTEM AND METHOD FOR COATED DUCTWORK

RELATED APPLICATION DATA

This is a divisional of U.S. Nonprovisional patent application Ser. No. 15/221,157, filed Jul. 27, 2016, and titled "Hot Tap System and Method for Coated Ductwork", which application claims the benefit of priority of U.S. Provisional Patent Application Ser. No. 62/208,125, filed Aug. 21, 2015, and titled "Hot Tap System and Method for Coated Ductwork", which is incorporated by reference herein in its entirety.

FIELD OF THE INVENTION

The present disclosure generally relates to pressurized duct systems for transporting corrosive substances and, more particularly, to a hot tap system and method for installing branch lines in such systems.

BACKGROUND

Many different types of manufacturing plants operate around the clock without shutting down except for emergency situations or infrequent, scheduled, long-term maintenance. Reasons for continuous operation include cost of shut down and restart, and potential impacts on quality of products until steady state is reached after restart. Semiconductor fabricating plants are an example of such a typically continuously-operating manufacturing facility. Because of continuous operation, it can at times be difficult or costly to improve, modify or otherwise change configurations in such facilities.

When a continuously-operating fabricating plant uses ducts or pipes for conveying flowable materials, which may include gases or liquids, sometimes modifications can be made by "hot tapping" into a pipe or duct to add a new branch line without the need to shut down. However, hot tapping in semiconductor fabricating plants presents special challenges due to the corrosive nature of the gases conveyed within the duct work and the properties of the corrosion-resistant materials, such as fluoropolymer coatings, used to protect the duct work. Difficulties include minimizing damage to the protective coating, the adhesion-resistant properties of the coatings and the fact that even with carefully controlled processes, hot tapping into a duct creates a cut edge of the duct exposed to the corrosive materials transported therethrough.

Various solutions have been proposed in the art for hot tapping coated ductwork transporting highly corrosive materials, including applying new protective coating material to the cut edges created during the hot tap process. However, available solutions are not always satisfactory due to difficulties in applying new coatings under field operating conditions, while maintaining system pressure, often in awkward positions where visibility of the areas to be treated is limited or impossible.

SUMMARY OF THE DISCLOSURE

In one implementation, the present disclosure is directed to a branch line connector for internally-coated duct systems. The branch line connector includes an inner flange shaped to mate with an inner surface of a duct wall surrounding an opening formed in the duct wall; an outer flange shaped to mate with an outer surface of the duct wall surrounding the opening formed in the duct wall, the other flange adapted to connect with the branch line; inner and outer gasket members configured and dimensioned to be disposed between the inner and outer flanges with an edge of the opening in the duct wall sealed between the inner and outer gasket members, wherein the inner gasket member is positioned to be compressed between the inner and outer flanges and the outer gasket member is positioned to be compressed between the inner flange and the duct wall when the flanges are installed on the duct wall; and means for securing together the inner and outer flanges on the duct wall around the opening.

In another implementation, the present disclosure is directed to a branch line connector for internally-coated duct systems. The branch line connector includes an inner flange shaped to mate with an inner surface of a duct wall surrounding an opening formed in the duct wall; an outer flange shaped to mate with an outer surface of the duct wall surrounding the opening formed in the duct wall, the other flange adapted to connect with the branch line; inner and outer gasket members configured and dimensioned to be disposed between the inner and outer flanges with an edge of said opening in the duct wall sealed between said inner and outer gasket members, wherein the inner gasket member is positioned to be compressed between the inner and outer flanges and the outer gasket member is positioned to be compressed between the inner flange and the duct wall when said flanges are installed on the duct wall; and mechanical fasteners positionable between the inner and outer gasket members to compress said gasket members between the inner and outer flanges.

In yet another implementation, the present disclosure is directed to a kit for installing a branch line in a pressurized duct system ducts with duct walls. The kit includes a branch line connector having an inner flange shaped to mate with an inner surface of the duct wall surrounding an opening formed in the duct wall, an outer flange adapted to connect the branch line shaped to mate with an outer surface of the duct wall surrounding the opening formed in the duct wall, and inner and outer gasket members configured and dimensioned to be disposed between the inner and outer flanges with an edge of said opening in the duct wall sealed between said inner and outer gasket members, wherein the inner gasket member is positioned to be compressed between the inner and outer flanges and the outer gasket member is positioned to be compressed between the inner flange and the duct wall by mechanical fasteners disposed between the inner and outer gasket members when said flanges are installed on the duct wall.

BRIEF DESCRIPTION OF DRAWINGS

For the purpose of illustrating disclosed embodiments, the drawings show aspects thereof. However, it should be understood that the disclosure is not limited to the precise arrangements and instrumentalities shown in the drawings, wherein.

DETAILED DESCRIPTION

Disclosed are systems, apparatus and methods for hot tapping into pressurized systems for conveying corrosive materials while protecting all surfaces of the tap and cut duct work against the corrosive environment. In one embodiment, the ductwork may comprise fluoropolymer coated stainless steel ductwork, but the disclosed systems and methods are also applicable to other similarly protected systems. As used herein, hot tapping refers to cutting into a live system to install a fitting for a branch line or other new service with minimal pressure loss within the system, which permits, for example, field installations without shutting off or pressure fluctuations to the system. Pressurized systems may include both systems with positive or negative pressure depending on application and circumstances of use of the disclosed systems, apparatus and methods.

Figure 1:
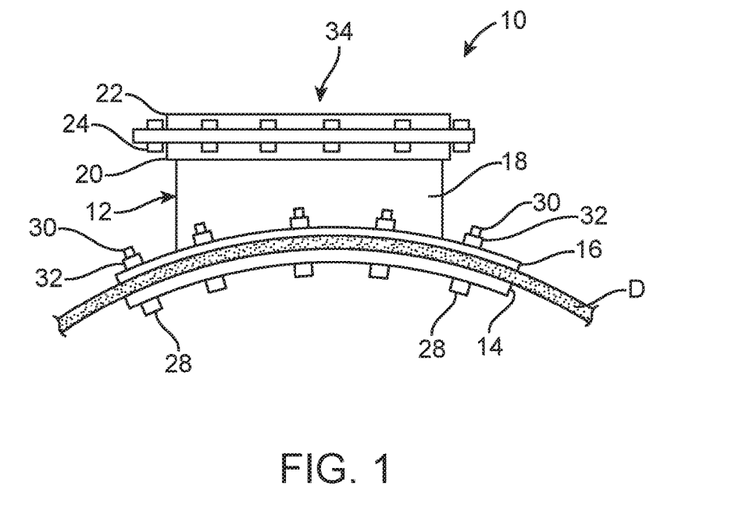
FIG. 1 is a schematic side-view diagram of a hot tap apparatus according to one embodiment disclosed herein.
Figure 2:
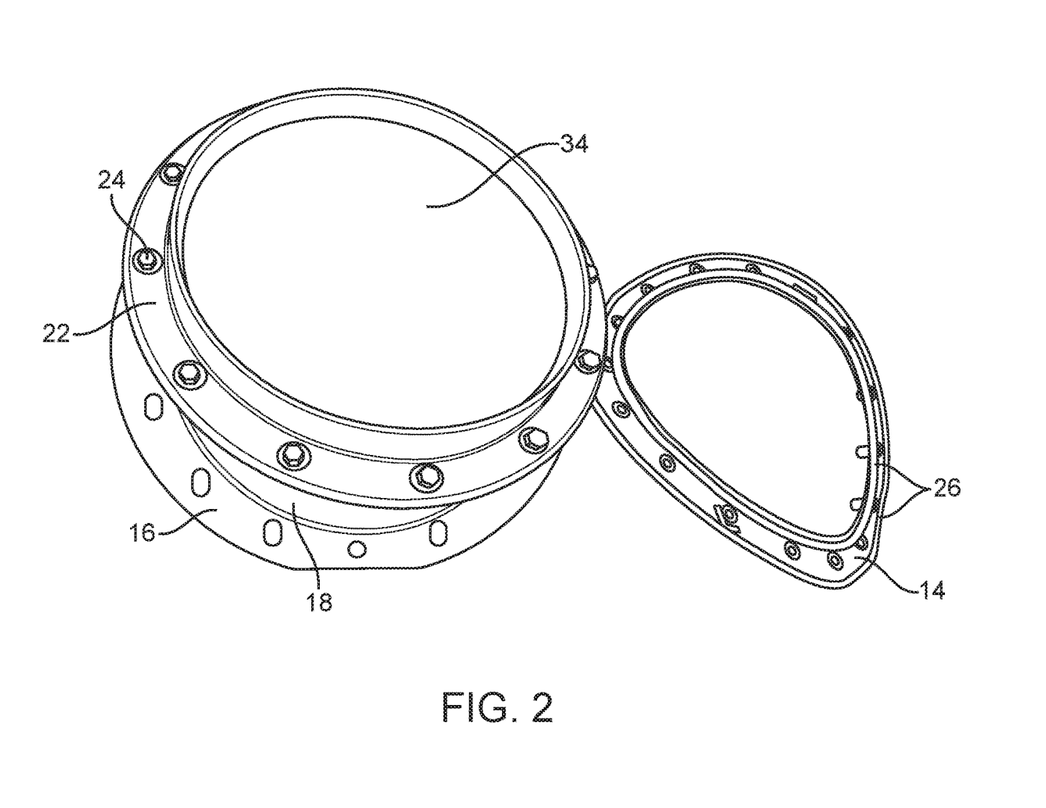
FIG. 2 is a perspective view of components of the hot tap apparatus shown in FIG. 1.

As shown in FIGS. 1 and 2, an exemplary hot tap apparatus 10 disclosed herein includes an outer assembly 12 and an inner flange 14. In the sketch of this example, the cross-section of the ductwork on which apparatus 10 is installed is designated by "D". Outer assembly 12 further includes outer flange 16 from which body 18 extends. Body 18 may be adapted as needed to connect to specific services, ducts, tools, etc. according to the purpose and need for creating the branch line. In this example, body 18 is provided with closure flange inner part 20 and closure flange outer part 22, which may be held together by any suitable means, such as nuts, washers and bolts 24 in order to provide a necessary connection to a branch line or other equipment, or as in FIG. 2, to capture closure plate 34 until final connections are made. Inner flange 14 includes captured cap nuts 28, which may be secured in a sealed manner to inner flange 14, for example, by welding, to provide a blind, threaded hole opening to the outside surface of the inner flange, but completely sealed on the inside surface. Cap nuts 28 thus provide a sealed means for connection to outer flange 16 by receiving threaded socket studs 30, which are further secured with nuts, washers and lock washers 32. All inner surfaces of outer assembly 12 and all surfaces of inner flange 14 are coated with a coating that is the same as or is compatible with the protective coating on the inside of the ductwork to be hot tapped. As used hereinafter, "branch line" refers to any line or equipment connectable or to be connected to an existing duct system using apparatus or methods disclosed herein.

As also shown in FIG. 2, inner flange 14 includes double gasket seal 26. Double gasket seal 26 is positioned on the inner surface of inner flange 14 such that the cut edge of the duct is captured between the inner and outer gasket member to isolate it from corrosive materials transported within the duct D after final installation. The material of double gasket seal 26 is also selected from a material compatible with the materials transported in the duct and will be adhered to the inner surface of inner flange 14 with a suitable adhesive or adhesive-like material. It should be appreciated that the seal between inner flange 14 and duct D after assembly is achieved primarily by the pressure applied through threaded socket studs 30 received in captured cap nuts 28. Thus, the primary purpose of the adhesive material holding double gasket seal 26 in place is to facilitate assembly until adequate pressure is applied. In some embodiments, particularly for use in semiconductor fabrication plant systems, double gasket seal 26 may comprise a fibrillated PTFE rope gasket with an adhesive coating and peel-off protective layer.

Figure 3:
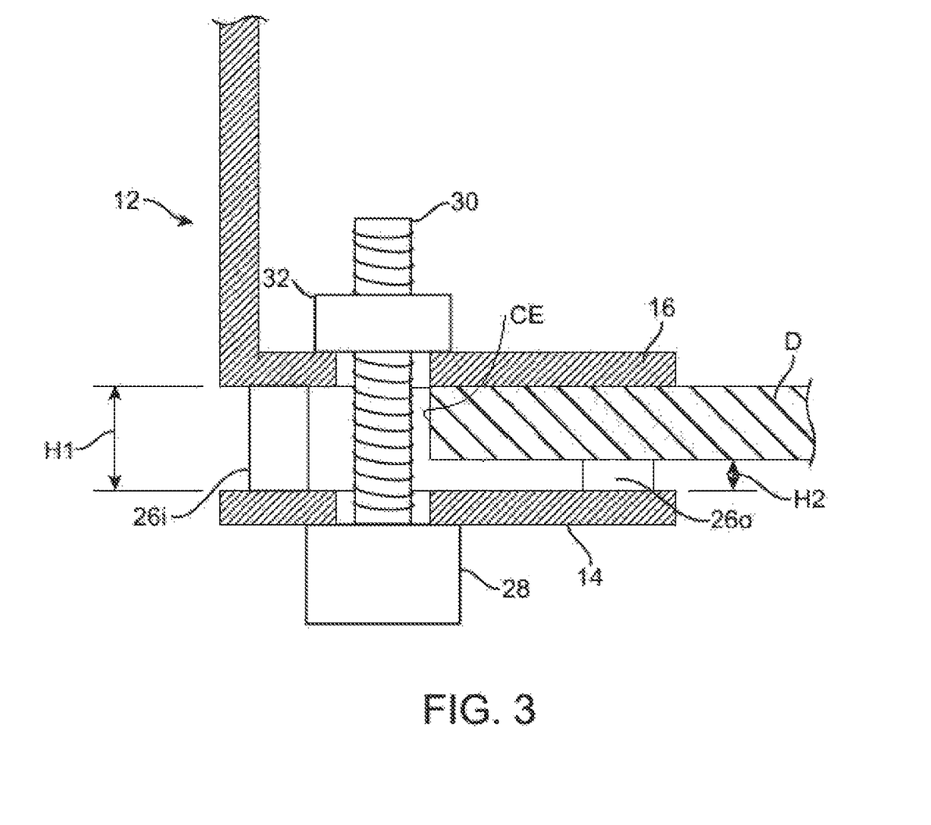
FIG. 3 is a schematic, partial cross-section of the hot tap apparatus shown in FIGS. 1 and 2.

The partial cross-section schematically depicted in FIG. 3 illustrates further features of the disclosed systems and apparatus. When assembled over a cut hole in duct D, inner gasket 26i of double gasket seal 26 is positioned inside the cut edge CE of the duct in order to protect the cut edge from the corrosive environment. To accommodate the thickness of the duct wall, it is preferable if inner gasket 26i has a height H1 greater than the height H2 of outer gasket 26o. In some embodiments height H1 will be approximately three times the thickness of the duct wall, whereas height H2 will be approximately two times the thickness of the duct wall. For example, in a system using fibrillated PTFE rope gasket material as mentioned above, with a 16 gauge duct wall (thickness approximately 1/16 inch), the uncompressed height H1 of inner gasket 26i may be about 3/16 inch and the uncompressed height H2 of outer gasket 26o may be about 1/8 inch. Each gasket may have a width of about 1/4 inch in such an exemplary embodiment. Persons of ordinary skill may devise other suitable relationships for H1/H2 dependent upon dimensions and materials in which the apparatus is to be used based on the teachings contained herein. It should be noted that relative dimensions as depicted in FIG. 3 are exaggerated to facilitate illustration of the features represented.

Figure 4:
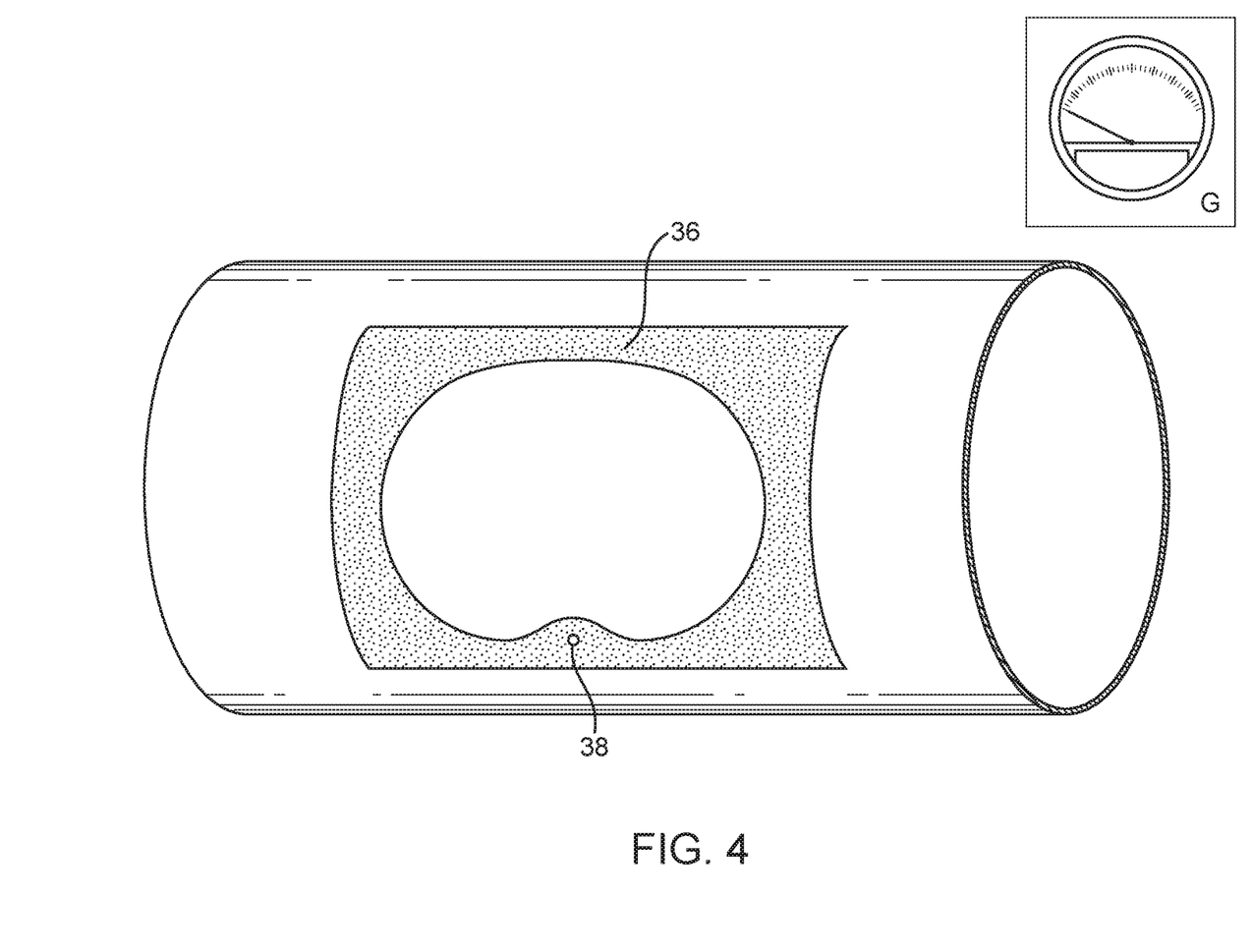
FIGS. 4, 5, 6, 7, 8, 9, 10 and 11 are perspective views illustrating steps of a method using an embodiment of a hot tap system disclosed herein.

Systems and methods for installing hot tap apparatus as disclosed above are described below with reference to FIGS. 4-12. It will be noted that in each of FIGS. 4-10, a system pressure gage (G) is shown, which indicates the relative negative pressure in a test system during an actual installation process. Pressure in FIG. 4 is indicated before any cut is made into the system. Thereafter, while minor leakage is indicated, it is not sufficient to have a meaningful effect on overall system pressure. But most importantly, the leakage is substantially constant at that initial low level throughout the installation process, without pressure spikes occurring at any point during the installation.

As shown in FIG. 4, location and size for connection of a new branch line using the disclosed system is identified and traced using template 36. The template defines the outline of the hole to be cut, and preferably, the template includes marker 38 for locating an indexing hole 44 (shown on FIG. 5) to receive an indexing/retaining nut as further described below. Tracing around the template provides an indication of the location for cutting into the duct shape of the hole to be cut. Marker 38 may be located in a slight indent in the shape of the hole to be cut to accommodate the location of the indexing hole and threaded indexing member. In some embodiments, the hole will also have a somewhat oblong shape and inner flange 14 is shaped complimentarily so that it can be manipulated through the cut hole and still seat and seal properly. In one exemplary embodiment, the hole is defined by a circle projected onto a duct with the diameter of the host duct. Then a 3/8" offset is applied to allow for the bolt circle on flange 14.

Figure 5:
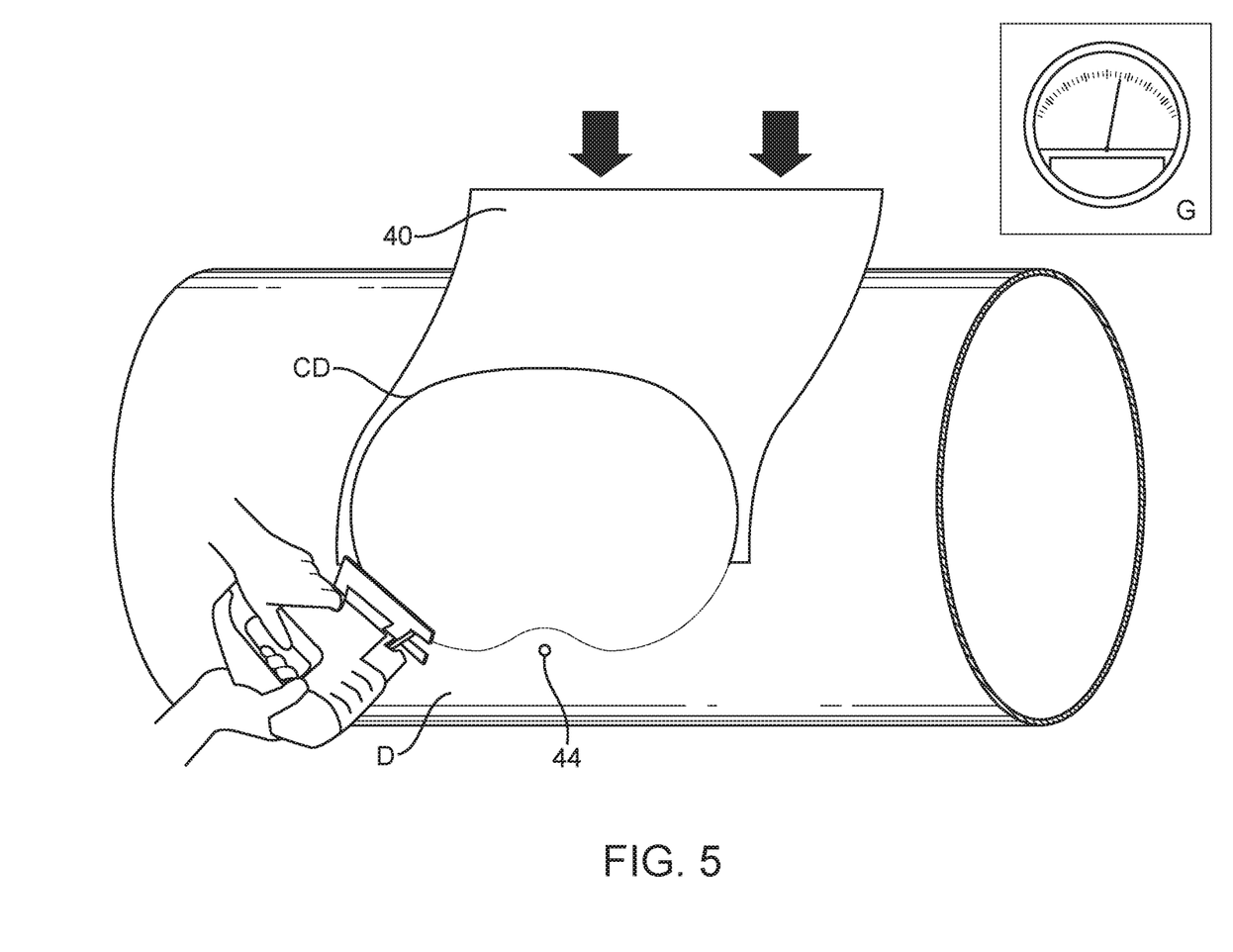

As illustrated in FIG. 5, blanking plate 40 is slid into place as the hole is cut in order to minimize pressure loss in the system. Preferably, blanking plate 40 has an indexing slot 46 (see FIG. 8) on its leading edge and is custom rolled to match the outer diameter of duct D to ensure a tight fit to limit system pressure loss. Using a thin cutting tool, such as a saw compatible with the ductwork, blanking plate 40 may be manipulated around by hand closely following the cut. Blanking plate 40 is held against the outside of the duct by the negative pressure within the duct system. Indexing hole 44 also may be drilled as located by marker 38. The cut piece of duct D to be removed is indicated at CD.

Figure 6:
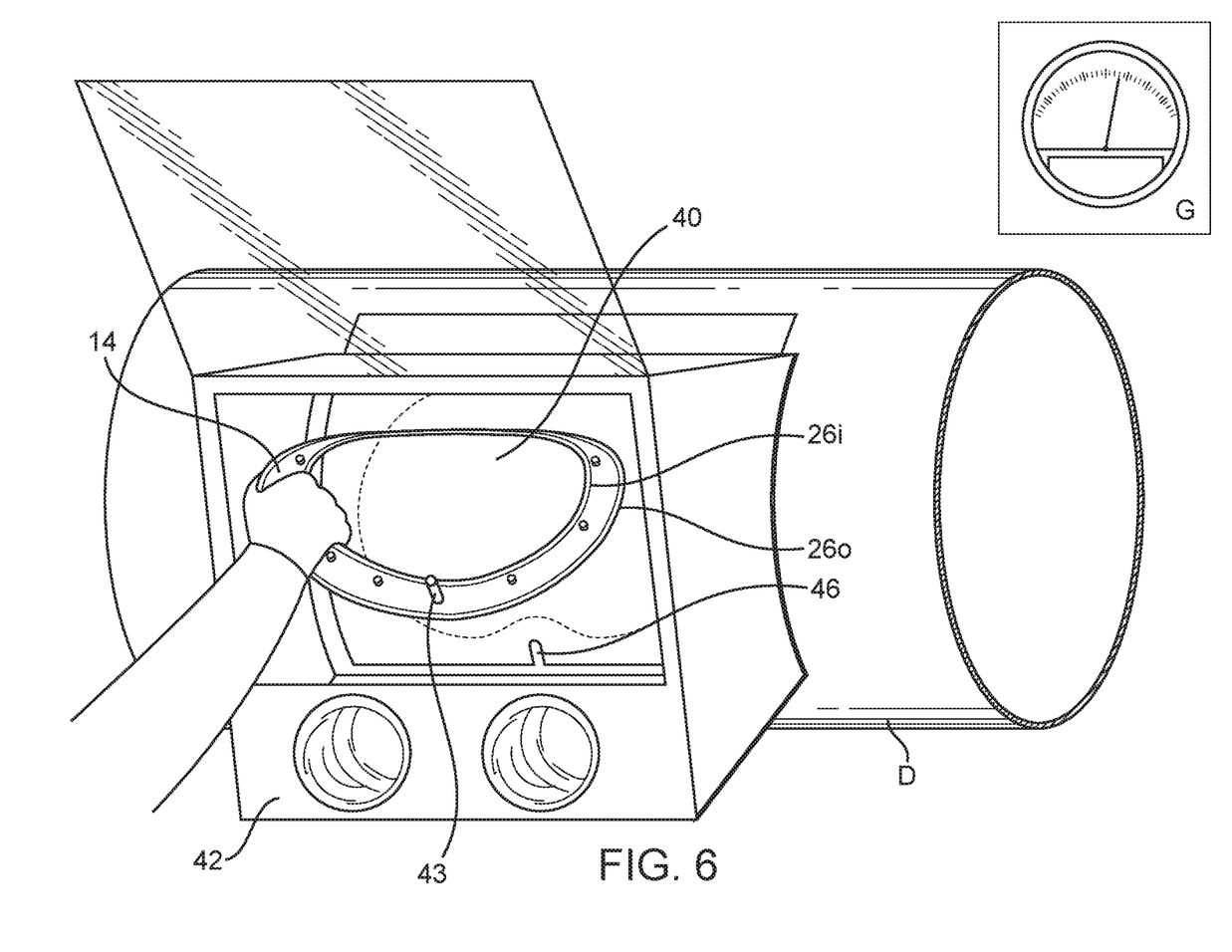

Next, as shown in FIG. 6, once the marked hole is appropriately cut and cut piece CD removed, glove box 42 is placed over the hole area with blanking plate 40 still in place. Glove box 42 is large enough so that it can accommodate inner flange 14 and also be secured on edges with blanking plate 40 in place, but slideable for removal after the glove box is secured. Securing of glove box 42 to the duct D can be done with suitable tape. Before removing blanking plate 40, the air-tight door of glove box 42 is opened and the inner flange 14 is placed in the box with retaining bolt 43 loosely threaded into one of captured cap nuts 28 as a threaded indexing member, located to correspond to the indexing hole 44 (see FIG. 5) previously drilled. The door of glove box 42 is then locked shut. As will be appreciated by persons of ordinary skill in the art, use of the blanking plate and glove box as described herein is well-suited to negative pressure systems.

Figure 7:
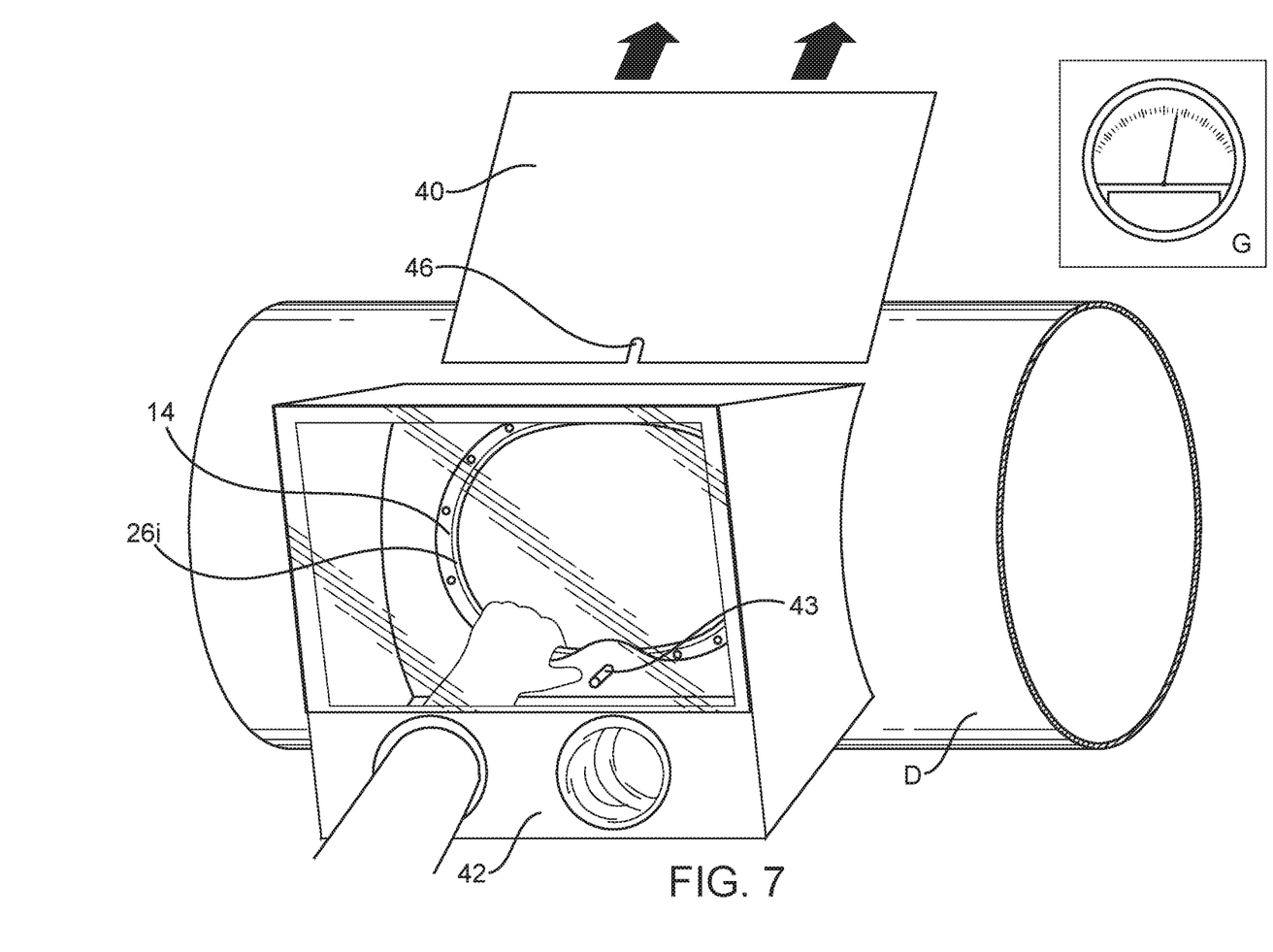
Figure 8:
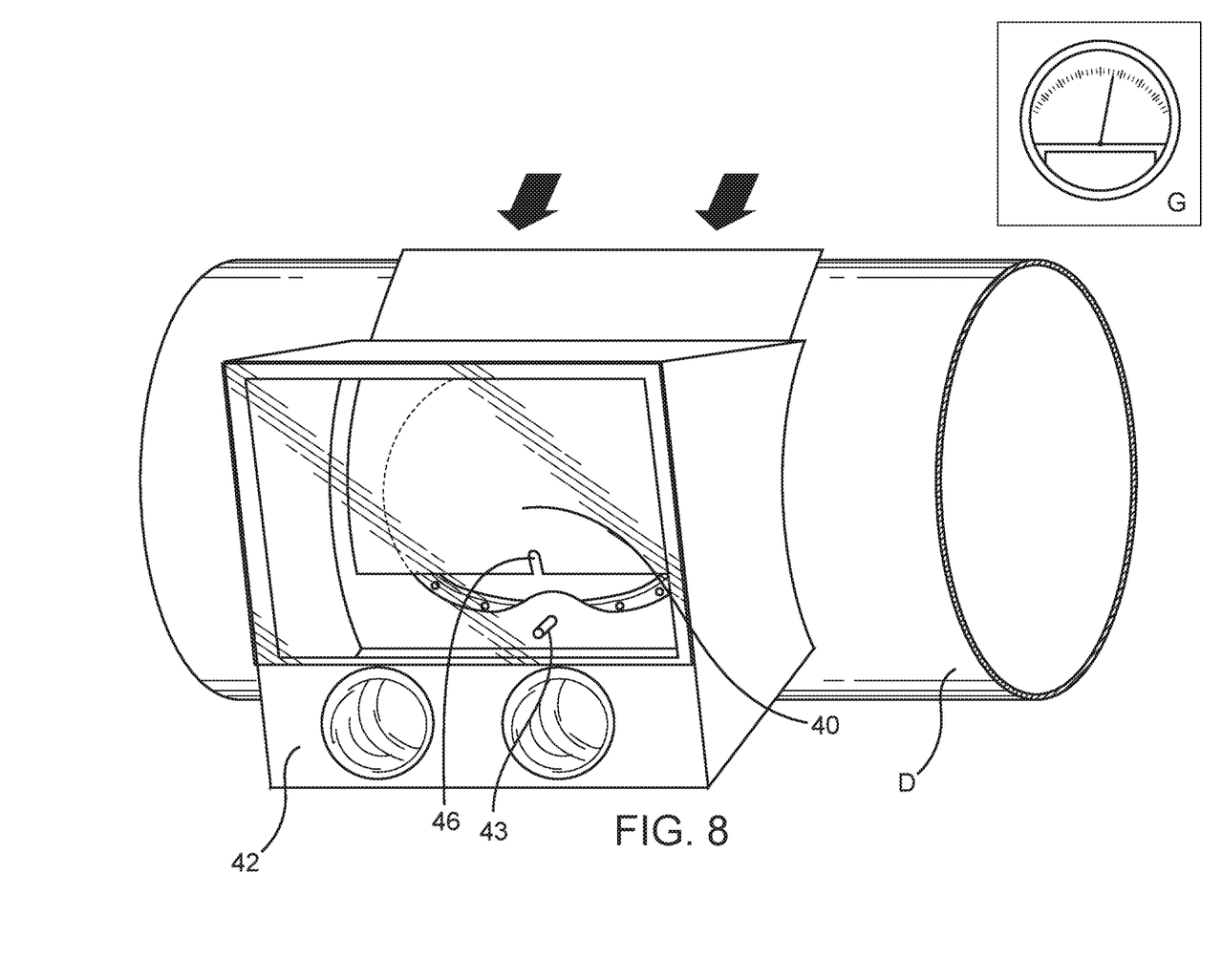

The installer then places his/her hands in the gloves of glove box 42, as shown in FIG. 7, and holds onto inner flange 14 to ensure it does not fall into the duct when the blanking plate is removed. Blanking plate 40 is then removed to allow access to the installation hole. Inner flange 14 is manipulated through the hole and positioned with the inner gasket 26*i* of double gasket seal 26 visible through the hole, while outer gasket 26*o* is positioned outside of the cut edge and generally not visible. During positioning, retaining bolt 43 is placed through indexing hole 44 to ensure proper positioning of inner flange 14. After placement is confirmed, blanking plate 40 is then slid back in place as shown in FIG. 8, aligning indexing slot 46 on the leading edge of the blanking plate with retaining bolt 43. When indexing slot 46 bottoms out on retaining bolt 43, the retaining bolt is tightened to a snug fit by hand. With backing plate 40 in place, the system is sealed and glove box 42 removed. In FIG. 8, blanking plate 40 has been pushed in about half way, with indexing slot 46 visible just before it entirely covers inner flange 14 and the inner gasket of double gasket seal 26.

In one embodiment, retaining bolt 43 is configured to cooperate with the specific system components with which it is intended to be used. As show in the figures, retaining bolt 43 is a shoulder bolt with a threaded section that matches the threads of captured nuts 28, but has a shoulder small enough in diameter to fit through the bolt holes in outer flange 16, yet large enough in diameter to capture the edges of indexing slot 46 so as to support inner flange 14 before installation of outer assembly 12 as described below. Alternatively, instead of a specially-designed shoulder bolt, one of socket studs 30 may be used with a specifically configured thin-walled tubular retaining nut dimensioned substantially as described above for the shoulder of retaining bolt 43. In each case, the shoulder of retaining bolt 43 or the tubular retaining nut may have an elongated shape to facilitate gripping and hand tightening with the gloves of glove box 42.

Figure 9:
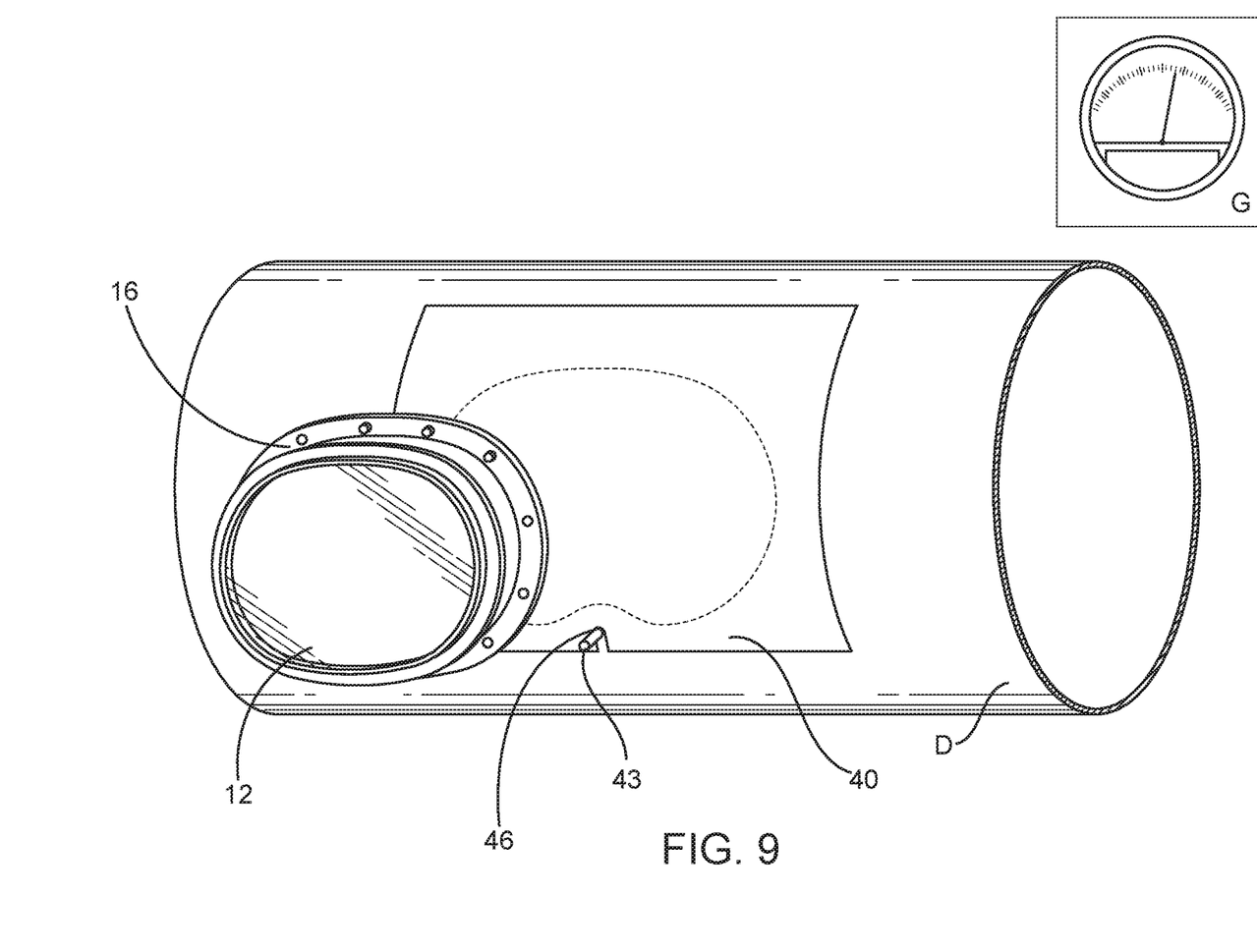
Figure 10:
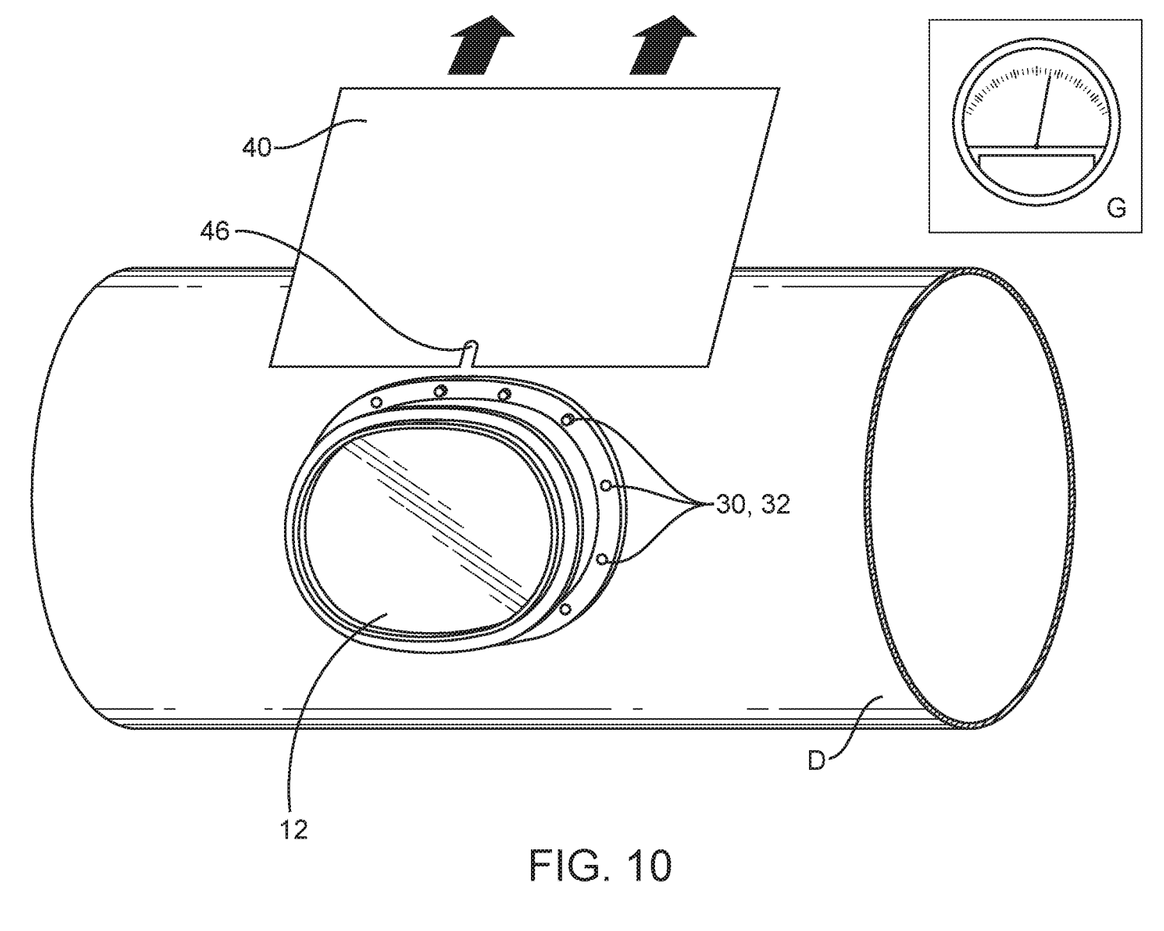
Figure 11:
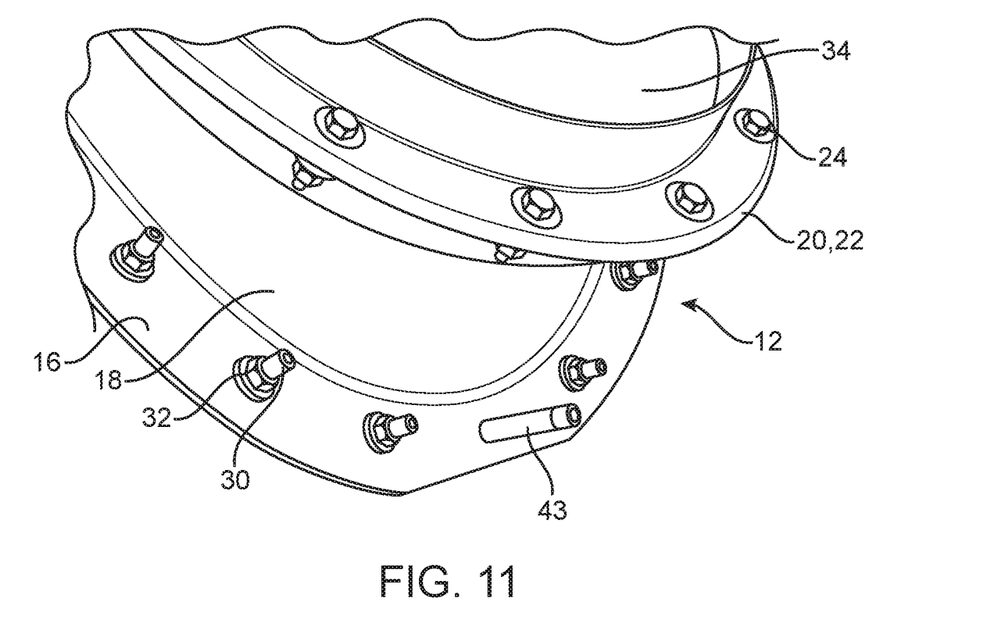

Once glove box 42 is removed, outer assembly 12 may be installed as shown in FIGS. 9-11. First, outer assembly 12 is placed onto the duct by aligning its indexing hole with the retaining bolt 43. Note that the indexing hole for outer assembly 12 is simply one of the bolt holes in outer flange 16, which is positioned to correspond to the location of indexing hole 44 in the final assembly. With outer assembly 12 properly positioned in place on the duct, blanking plate 40 is then slowly slid back to allow the installation of studs 30 into captured cap nuts 28 of inner flange 14. Threaded socket studs 30 are provided with hex or other sockets at the outer end to receive a driving tool. After placement of studs 30, flat washer, lock washer and nut 32 are assembled onto each stud 30. This process is repeated until all studs are installed for all available holes. Once all other studs and washer/nut combinations are installed, retaining bolt 43 is removed and replaced with a stud/washer/nut combination as in the other flange holes. If a tubular retaining nut is used instead of retaining bolt 43, as described above, then only the retaining nut is removed and the nuts/washers 32 are applied to the stud 30 already in place. In one exemplary embodiment, nuts 32 are torqued to about 30 lbft.

Figure 12:
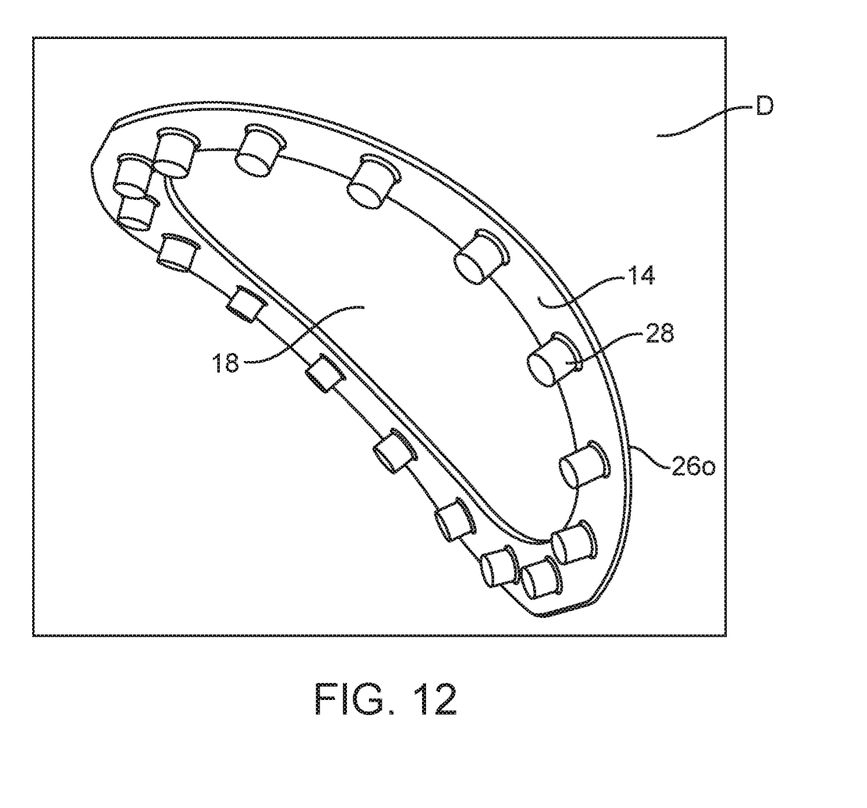
FIG. 12 is a perspective view illustrating the interior of a duct with an installed hot tap apparatus according to an embodiment disclosed herein.

As illustrated in FIG. 12, and as will be appreciated by persons of ordinary skill based on the teachings presented hereinabove, the entire inside surface of inner flange 14 may be coated with the same coating as the inside of duct D, for example with fluoropolymer matching the duct inner surface. The only non-coated area presented to corrosive environment within the duct may be the edge of outer gasket 26*o* of double gasket seal 26, but that also comprises a suitable corrosion-resistant material. In this manner, the cut edge of the hole made for the branch line, which is not coated due to its being cut in service, is captured and sealed between the inner and outer gaskets of double gasket seal 26. It will also be appreciated by persons of skill in the art that embodiments described herein may be used with uncoated ducting to also provide a convenient means and method for installing a branch line or other equipment in without shutdown or excessive pressure loss in the system.

As will also be appreciated by persons of ordinary skill, while illustrative embodiments disclosed above are described in connection with negative pressure systems, embodiments may be readily adapted to positive pressure systems based without departing from the present disclosure.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A branch line connector for internally-coated duct systems, comprising:
    an inner flange shaped to mate with an inner surface of a duct wall surrounding an opening formed in the duct wall;
    an outer flange shaped to mate with an outer surface of the duct wall surrounding the opening formed in the duct wall, the other flange adapted to connect with the branch line;
    inner and outer gasket members configured and dimensioned to be disposed between the inner and outer flanges with an edge of said opening in the duct wall sealed between said inner and outer gasket members, wherein the inner gasket member is positioned to be compressed between the inner and outer flanges and the outer gasket member is positioned to be compressed between the inner flange and the duct wall when said flanges are installed on the duct wall; and
    means for securing together the inner and outer flanges on the duct wall around said opening.

2. The branch line connector of claim 1, wherein said securing means is positioned between said inner and outer gasket members.

3. The branch line connector of claim 1, wherein the inner and outer gasket members each have an uncompressed height and the uncompressed height of the inner gasket member is greater than the uncompressed height of the outer gasket member.

4. The branch line connector of claim 3, wherein the outer gasket member uncompressed height is approximately two-thirds of the inner gasket member uncompressed height.

5. The branch line connector of claim 1, wherein said securing means comprises threaded, blind holes arranged around the inner flange and opening to an outside surface of the inner flange.

6. The branch line connector of claim 5, wherein in the securing means further comprises male threaded members configured and dimensioned to be received in said threaded blind holes, and corresponding holes in the outer flange for receiving said threaded male members.

7. The branch line connector of claim 5, further comprising a corrosion resistant coating on the inner flange and inner surfaces of the outer flange.

8. The branch line connector of claim 1, in combination with the duct wall of the duct system, wherein:
    the inner flange is disposed against the inner surface of the duct wall;
    the outer flange is disposed against the outer surface of the duct wall;
    the inner gasket member is disposed within the opening in the duct wall, compressed between the inner and outer flanges;
    the outer gasket member is disposed outside the opening in the duct wall, compressed between the inner flange and inner surface of the duct wall; and
    said securing means comprises plural threaded fasteners arranged around the inside of the opening in the duct wall, between the inner and outer gasket members.

9. The branch line connector as in claim 8, wherein the duct system has an internal fluoropolymer corrosion resistant coating and all surfaces of the inner and outer flanges exposed to substances transported in the duct system after installation have a fluoropolymer corrosion resistant coating prior to installation.

10. A branch line connector for internally-coated duct systems, comprising:
    an inner flange shaped to mate with an inner surface of a duct wall surrounding an opening formed in the duct wall;
    an outer flange shaped to mate with an outer surface of the duct wall surrounding the opening formed in the duct wall, the other flange adapted to connect with the branch line;
    inner and outer gasket members configured and dimensioned to be disposed between the inner and outer flanges with an edge of said opening in the duct wall sealed between said inner and outer gasket members, wherein the inner gasket member is positioned to be compressed between the inner and outer flanges and the outer gasket member is positioned to be compressed between the inner flange and the duct wall when said flanges are installed on the duct wall; and
    mechanical fasteners positionable between the inner and outer gasket members to compress said gasket members between the inner and outer flanges.

11. The branch line connector of claim 10, wherein said mechanical fasteners comprise threaded fasteners and corresponding threaded blind holes on the outer flange.

12. The branch line connector of claim 10, further comprising a corrosion resistant coating on the inner flange and inner surfaces of the outer flange.

13. The branch line connector of claim 10, in combination with the duct wall of the duct system, wherein:
    the inner flange is disposed against the inner surface of the duct wall;
    the outer flange is disposed against the outer surface of the duct wall;
    the inner gasket member is disposed within the opening in the duct wall, compressed between the inner and outer flanges;
    the outer gasket member is disposed outside the opening in the duct wall, compressed between the inner flange and inner surface of the duct wall; and
    plural threaded fasteners arranged around the inside of the opening in the duct wall, between the inner and outer gasket members to compress said gasket members.

14. The branch line connector as in claim 13, wherein the duct system has an internal fluoropolymer corrosion resistant coating and all surfaces of the inner and outer flanges exposed to substances transported in the duct system after installation have a fluoropolymer corrosion resistant coating prior to installation.

15. A kit for installing a branch line in a pressurized duct system ducts with duct walls, comprising a branch line connector having an inner flange shaped to mate with an inner surface of the duct wall surrounding an opening formed in the duct wall, an outer flange adapted to connect the branch line shaped to mate with an outer surface of the duct wall surrounding the opening formed in the duct wall, and inner and outer gasket members configured and dimensioned to be disposed between the inner and outer flanges with an edge of said opening in the duct wall sealed between said inner and outer gasket members, wherein the inner gasket member is positioned to be compressed between the inner and outer flanges and the outer gasket member is positioned to be compressed between the inner flange and the duct wall by mechanical fasteners disposed between the inner and outer gasket members when said flanges are installed on the duct wall.

16. The kit of claim 15, further comprising threaded fasteners as said mechanical fasteners.

17. The kit of claim 16, wherein said outer flange is provided with threaded blind holes for receiving said threaded fasteners.

18. The kit of claim 15, further comprising a blanking plate and glove box.

19. The kit of claim 18, further comprising an indexing fastener securable to the inner flange.

* * * * *